US010425168B2

(12) United States Patent
Yamasaki et al.

(10) Patent No.: US 10,425,168 B2
(45) Date of Patent: Sep. 24, 2019

(54) TARGET IDENTIFICATION SYSTEM, PARKING APPARATUS, AND VEHICLE

(71) Applicant: PANASONIC INTELLECTUAL PROPERTY MANAGEMENT CO., LTD., Osaka (JP)

(72) Inventors: Shigeaki Yamasaki, Osaka (JP); Masaaki Ikehara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/820,170

(22) Filed: Nov. 21, 2017

(65) Prior Publication Data

US 2018/0152250 A1 May 31, 2018

(30) Foreign Application Priority Data

Nov. 29, 2016 (JP) ................................ 2016-231874

(51) Int. Cl.
*H04B 10/116* (2013.01)
*H04W 12/08* (2009.01)
*H04B 10/80* (2013.01)
*H04B 10/66* (2013.01)

(52) U.S. Cl.
CPC ........... *H04B 10/80* (2013.01); *H04B 10/116* (2013.01); *H04B 10/66* (2013.01); *H04W 12/08* (2013.01)

(58) Field of Classification Search
CPC combination set(s) only.
See application file for complete search history.

(56) References Cited

U.S. PATENT DOCUMENTS 5,422,473 A * 6/1995 Kamata .............. G06K 17/0022 235/384
2002/0021228 A1* 2/2002 Amita ................. G06Q 20/105 340/928

(Continued)

FOREIGN PATENT DOCUMENTS

JP 05-242098 A 9/1993
JP 10-063896 A 3/1998
JP 2015-177213 A 10/2015

*Primary Examiner* — Omar S Ismail
(74) *Attorney, Agent, or Firm* — McDermott Will & Emery LLP

(57) ABSTRACT

A target identification system includes: one or more optical receivers (at least one of a first optical receiver or a second optical receiver) which receive outgoing light from a moving body, the outgoing light including an optical signal indicating identification information (first information) for identifying the moving body; a controller connected to the one or more optical receivers; and a wireless communicator connected to the controller. When the one or more optical receivers receive the outgoing light, the controller obtains the identification information, and when the controller receives radio waves including the identification information and service information (second information) via the wireless communicator, in the case where the identification information included in the outgoing light matches the identification information included in the radio waves, the controller obtains the service information, the service information being information necessary for the moving body to receive a predetermined service.

13 Claims, 13 Drawing Sheets

(56) References Cited

U.S. PATENT DOCUMENTS

| | | | | |
|---|---|---|---|---|
| 2007/0100687 | A1* | 5/2007 | Yoshikawa | G06Q 30/0284 705/13 |
| 2014/0320317 | A1* | 10/2014 | Grauer | G08G 1/096716 340/907 |
| 2015/0173156 | A1* | 6/2015 | Pedersen | H05B 37/0272 315/151 |
| 2015/0263808 | A1* | 9/2015 | Kondo | H04B 10/116 398/115 |
| 2016/0065306 | A1* | 3/2016 | Huang | H04B 10/116 398/118 |
| 2016/0352422 | A1* | 12/2016 | Yue | H04B 10/116 |
| 2017/0278410 | A1* | 9/2017 | Byers | B64C 39/024 |

* cited by examiner

TARGET IDENTIFICATION SYSTEM, PARKING APPARATUS, AND VEHICLE

CROSS REFERENCE TO RELATED APPLICATION

This application claims the benefit of priority of Japanese Patent Application Number 2016-231874 filed on Nov. 29, 2016, the entire content of which is hereby incorporated by reference.

BACKGROUND

1. Technical Field

The present disclosure relates to a target identification system, a parking apparatus, and a vehicle.

2. Description of the Related Art

In recent years, toll collection systems that perform wireless communication using radio waves have been set up in toll roads such as expressways, parking lots, etc. The toll collection systems are configured to collect fees (fee information) for using toll roads from vehicles by wireless communication between the vehicles and roadside devices disposed in the toll roads or parking lots.

Radio waves including wireless signals for use in wireless communication generally have no directivity and are emitted broadly, which may cause interference with each vehicle. For this reason, toll roads are designed to minimize interference by restricting lanes and limiting a communication area for wireless signals to a small area. Such limiting of the wireless communication area, however, requires a huge area of land or facilities.

In order to avoid the above-mentioned interference, a technique for using light having higher directivity than directivity of radio waves has been disclosed. (For example, see Patent Literature (PTL) 1 (Japanese Unexamined Patent Application Publication No. H10-063896)). The technique disclosed in PTL 1 makes it possible to avoid the interference by using light including an optical signal.

SUMMARY

However, a vehicle travel trajectory, a speed, etc. differ from vehicle to vehicle, and when, for example, bidirectional communication is performed several times, an optical signal may not be successfully obtained and information may not be accurately communicated, depending on a positional relationship between a vehicle and a roadside device capable of transmitting and receiving an optical signal.

The present disclosure provides, for example, a target identification system with improved communication reliability.

A target identification system according to one aspect of the present disclosure includes: an optical receiver which receive outgoing light from a moving body, the outgoing light including an optical signal indicating first information for identifying the moving body; a controller which is connected to the one or more optical receivers; and a wireless communicator which is connected to the controller. When the optical receiver receives the outgoing light, the controller obtains the first information, and when the controller receives radio waves including the first information and second information via the wireless communicator, in the case where the first information included in the outgoing light matches the first information included in the radio waves, the controller obtains the service information, the service information being information necessary for the moving body to receive a predetermined service.

Moreover, a parking apparatus according to one aspect of the present disclosure is a parking apparatus which is disposed in a parking lot and includes the above-described target identification system. The optical receiver includes: a first optical receiver which is disposed at an entrance of the parking lot; and a second optical receiver which is disposed at an exit of the parking lot. The controller: obtains the second information when the controller receives the radio waves including the first information and the second information from the moving body via the wireless communicator, in the case where the first optical receiver receives the outgoing light; and transmits radio waves including use information about use of the parking lot to the moving body via the wireless communicator when the second optical receiver receives the outgoing light, the use information indicating the predetermined service received by the moving body.

Moreover, a vehicle according to one aspect of the present disclosure is a vehicle which includes: a first light emitter which emits outgoing light including an optical signal indicating first information for identifying the vehicle; a vehicular controller which is connected to the first light emitter; a vehicular wireless communicator which is connected to the vehicular controller; a user interface which, when the vehicular controller receives radio waves including confirmation information via the vehicular wireless communicator, makes a presentation to cause an operator to input an instruction according to the confirmation information, the confirmation information being information for requesting transmission of second information necessary to receive a predetermined service; and an obtainer which obtains the instruction. The vehicular controller transmits radio waves including authorization information, and radio waves including the first information and the second information, when the instruction is an instruction to authorize the transmission of the second information, in the case where the obtainer obtains the instruction, the authorization information indicating authorization for the transmission of the second information.

The present disclosure provides, for example, a target identification system with improved communication reliability.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments will be described with reference to the drawings. It should be noted that the embodiments described below each show a general or specific example. The numerical values, shapes, materials, structure components, steps, the order of the steps, etc. indicated in the following embodiments are mere examples, and therefore are not intended to limit the present disclosure. Moreover, among the structural components in the following embodiments, structural components not recited in any of the independent claims defining the broadest inventive concepts are described as optional structural components.

Furthermore, the figures are schematic diagrams and are not necessarily precise illustrations. It should be noted that substantially identical components are assigned the same reference signs in the figures, and overlapping description thereof is omitted or simplified.

Embodiment

[Configuration of Target Identification System]

Figure 1:
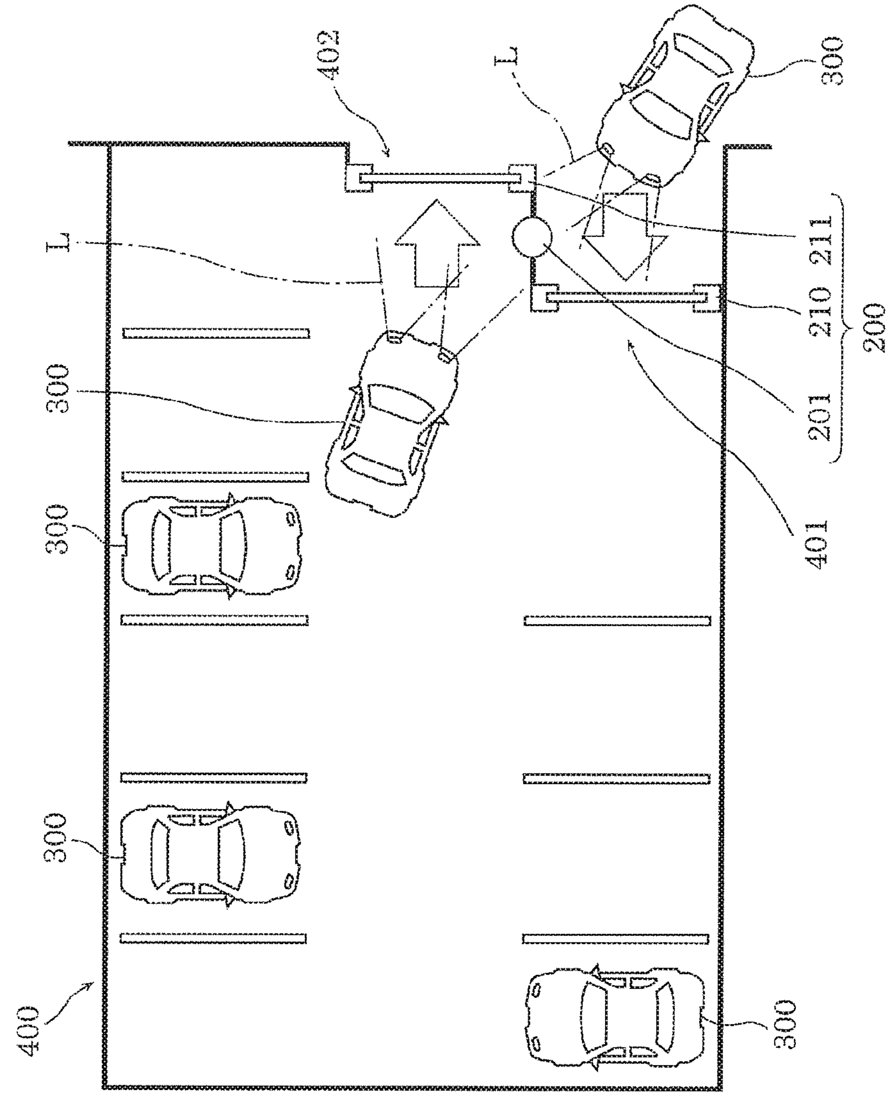
FIG. 1 is a schematic view of a parking lot including a parking apparatus that is a specific example of a target identification system according to an embodiment.
Figure 2:
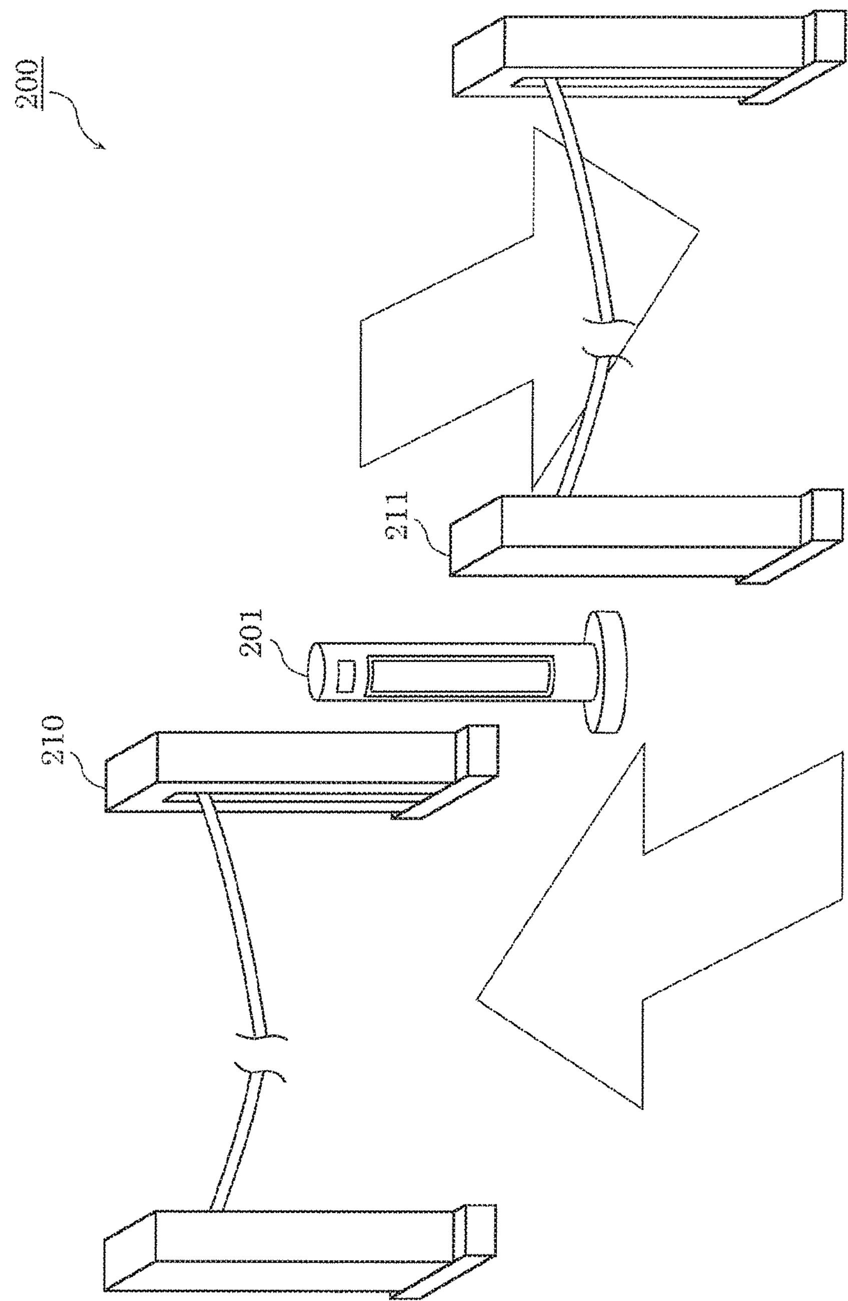
FIG. 2 is an external perspective view illustrating the parking apparatus according to the embodiment.
Figure 3:
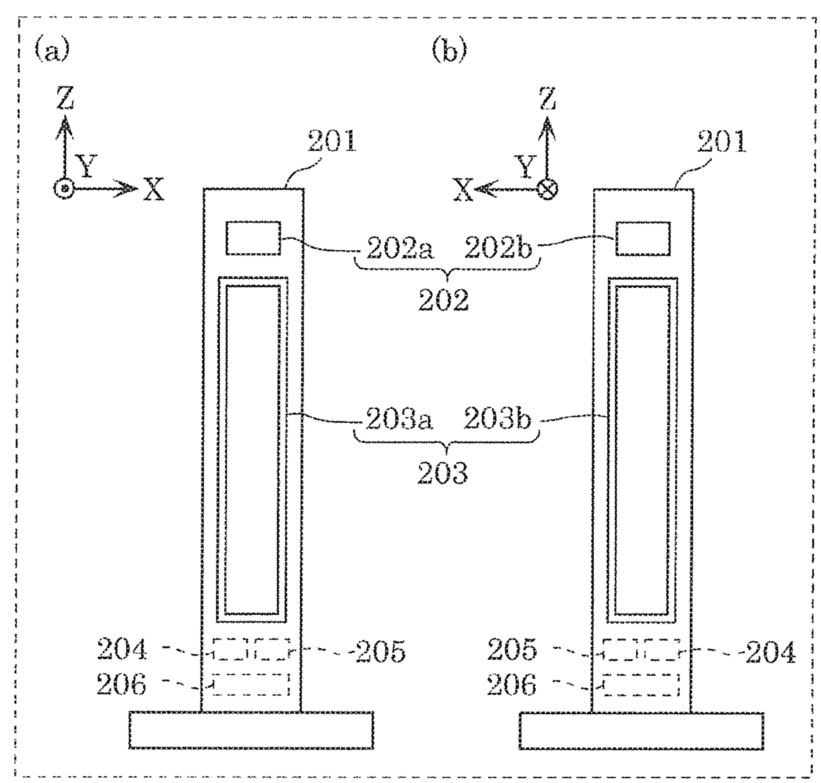
FIG. 3 is a side view illustrating a roadside device of the parking apparatus according to the embodiment.

First, a configuration of a target identification system according to an embodiment will be described in detail with reference to FIG. 1 through FIG. 4. FIG. 1 is a schematic view of a parking lot including a parking apparatus that is a specific example of the target identification system according to the embodiment. FIG. 2 is an external perspective view illustrating the parking apparatus according to the embodiment. FIG. 3 is a side view illustrating a roadside device of the parking apparatus according to the embodiment.

Target identification system (parking apparatus) 200 according to the embodiment is a system which identifies a moving body such as vehicle 300 when the moving body receives a service managed by target identification system 200, and which manages the moving body and the service in association with each other. The above-described service is, for example, a service regarding the use of a parking lot, the use of a toll road, etc. It should be noted that the moving body is a vehicle such as an automobile, a motorized bicycle, and a motorcycle.

As illustrated in FIG. 1, vehicle (moving body) 300 enters parking lot 400 through parking lot entrance (entrance) 401, and vehicle 300 parked in parking lot 400 exits parking lot 400 through parking lot exit (exit) 402. Parking lot 400 includes parking apparatus 200 that is a specific example of target identification system 200 according to the embodiment.

As illustrated in FIG. 2, parking apparatus 200 includes roadside device 201, entrance gate (gate) 210, and exit gate (gate) 211.

Roadside device 201 is a device which, for example, permits the entry and exit of vehicle 300 using parking lot 400. When vehicle 300 enters parking lot 400, roadside device 201 identifies vehicle 300 and causes entrance gate 210 to open so that vehicle 300 can enter parking lot 400. When vehicle 300 exits parking lot 400, roadside device 201 identifies vehicle 300 and causes exit gate 211 to open so that vehicle 300 can exit parking lot 400. In this case, for example, if a parking fee is charged, roadside device 201 collects the parking fee.

It should be noted that although not shown, roadside device 201, entrance gate 210, and exit gate 211 are communicable with each other via a connection. Entrance gate 210 and exit gate 211 receive instructions from controller 102 (see FIG. 4, for example) included in roadside device 201, and allow or disallow vehicle 300 to pass. Roadside device 201, entrance gate 210, and exit gate 211 are communicable with each other via a wired or wireless connection. For example, roadside device 201, entrance gate 210, and exit gate 211 may be electrically connected by electric wiring etc., and entrance gate 210 and exit gate 211 may be operated based on instructions from controller 102.

Next, a specific configuration of roadside device 201 will be described.

As illustrated in FIG. 3, roadside device 201 includes optical sensor 202 (202*a* and 202*b*), display 203 (203*a* and 203*b*), central processing unit (CPU) 204, memory 205, and communication interface 206. It should be noted that (a) of FIG. 3 is a side view of roadside device 201 when roadside device 201 is viewed from a side, and (b) of FIG. 3 is a side view of roadside device 201 when roadside device 201 is viewed from a side opposite the side in (a) of FIG. 3.

Optical sensor 202 (202*a* and 202*b*) is an optical device that receives light. Specifically, optical sensor 202 receives outgoing light L emitted by vehicle 300 and including an optical signal. Roadside device 201 identifies vehicle 300 by receiving outgoing light L that is emitted by headlamps 310 or daytime running lamps 320 (see FIG. 5A) included in vehicle 300 and that includes the optical signal. Specifically, roadside device 201 obtains information for identifying vehicle 300, by causing optical sensor 202 to receive the optical signal included in outgoing light L and indicating identification information for identifying vehicle 300. It should be noted that the identification information is an example of first information.

Here, the optical signal is a signal in which information is superimposed on light by causing light emitted by a light source such as a light-emitting diode to blink at high speed, that is, switching between a lighting state and a non-lighting state at high speed. Although outgoing light L may include ultraviolet light and/or infrared light, outgoing light L is visible light in the embodiment. In other words, vehicle 300 transmits the optical signal to roadside device 201 through visible light communication. The optical signal includes identification information for identifying a moving body such as vehicle 300. The identification information about vehicle 300 indicated by the optical signal may be any information as long as vehicle 300 can be identified, and examples of the identification information include a vehicle registration number.

Optical sensor 202 is, for example, a photodiode or an image sensor such as a charge-coupled device (CCD) and a complementary metal-oxide semiconductor (CMOS).

In order to receive outgoing light L that is emitted by each of vehicle 300 entering parking lot 400 and vehicle 300 exiting parking lot 400 and that includes the optical signal, roadside device 201 includes optical sensor 202*a* on a side of entrance gate 210, and optical sensor 202*b* on a side of exit gate 211.

Display 203 (203*a* and 203*b*) is a display device that displays, for the driver (operator) of vehicle 300, processing executed by CPU 204 and to be described or the like, in an image such as characters. Specifically, when optical sensor 202 receives outgoing light L emitted by vehicle 300 and including the optical signal, CPU 204 causes display 203 to display characters such as "Waiting." In order to display the image for each of vehicle 300 entering parking lot 400 and vehicle 300 exiting parking lot 400, roadside device 201 includes display 203*a* on the side of entrance gate 210, and display 203*b* on the side of exit gate 211.

It should be noted that parking lot 400 may have a gate for at least one of entrance 401 or exit 402. For example, when the gate is provided to only one of entrance 401 and exit 402 of parking lot 400, roadside device 201 may include one optical sensor 202 and one display 203.

CPU 204 is a processor that obtains the identification information about vehicle 300 indicated by the optical signal included in outgoing light L which is emitted by vehicle 300 entering parking lot 400 and which is received by optical sensor 202*a*, and that stores the identification information into memory 205 to be described. CPU 204 is connected to optical sensor 202 and communication interface 206 in a communicable manner or electrically.

In recent years, examples of a toll collection system for use in an expressway, a parking lot, etc. include an electronic toll collection system (ETC (registered trademark)). ETC is a system that collects a toll by performing wireless communication between ETC transponder 340 (see FIG. 5B) of vehicle 300 and an ETC roadside device set up at a gate of a toll road such as an expressway, using radio waves in a several GHz band. Specifically, the toll for the expressway or the like is collected by using ID information included in ETC card 350 (see FIG. 5B) inserted in ETC transponder 340.

CPU 204 wirelessly communicates with vehicle 300 via communication interface 206 using radio waves. Specifically, by using above ETC, parking apparatus 200 obtains ETC information from vehicle 300, and collects a fee for parking lot 400. Here, the ETC information is ID information unique to ETC card 350 and ID information unique to ETC transponder 340.

Moreover, as stated above, radio waves including wireless signals generally have no directivity and are emitted broadly, which may cause interference with each vehicle. For this reason, for example, toll roads are designed to minimize interference of wireless signals by restricting lanes for vehicles and limiting a communication area for the wireless signals to a small area. Such restricting of the lanes and limiting of the wireless communication area, however, require a huge area of land or facilities, and defeat the purpose of ETC. Furthermore, because a vehicle travel trajectory, a speed, etc. differ from vehicle to vehicle, when an optical signal is transmitted and received several times, a vehicle and a roadside device may not successfully obtain the optical signals depending on a positional relationship between the vehicle and the roadside device.

In view of this, target identification system (parking apparatus) 200 according to the embodiment obtains identification information of vehicle 300 by receiving, from vehicle 300, outgoing light L including an optical signal. In addition, after parking apparatus 200 obtains the identification information, parking apparatus 200 and vehicle 300 transmit and receive information through wireless communication using radio waves. Specifically, the radio waves transmitted by vehicle 300 include the above-described identification information and service information allowing vehicle 300 (specifically the driver of vehicle 300) to receive a predetermined service. The service information is information allowing vehicle 300 (specifically the driver of vehicle 300) to receive a predetermined service, and is, for example, the above-described ETC information. It should be noted that the service information is an example of second information.

It should be noted that the service information may be, for example, information (e.g., unique information indicating a user) that is for use in a parking lot only specific vehicle 300 can use and that is different from the above-described identification information. Moreover, the service information may be charging information necessary for charging the fee of a service received by a moving body. Specifically, when the moving body received the service, target identification system (parking apparatus) 200 may charge (collect) the fee using a unique number etc. of a credit card, a prepaid card, or the like as the service information. A specific procedure in which parking apparatus 200 identifies vehicle 300 will be described later.

When optical sensor 202*a* receives outgoing light L, CPU 204 receives radio waves including the above-described identification information and service information from vehicle (moving body) 300 via communication interface 206.

Specifically, when optical sensor 202*a* receives the optical signal, CPU 204 transmits radio waves including confirmation information for requesting transmission of the service information, to the moving body (vehicle 300) via communication interface 206. In other words, when optical sensor 202*a* receives the optical signal, CPU 204 transmits the radio waves including the confirmation information for requesting transmission of indication information indicating whether the moving body intends to receive a service (whether the service information can be transmitted), to the moving body via communication interface 206. Moreover, in the case where CPU 204 receives radio waves including indication information from the moving body, when the indication information is authorization information indicating authorization for the transmission of the service information, CPU 204 receives the radio waves including the identification information and the service information from the moving body, and obtains the identification information and the service information. Furthermore, CPU 204 checks the identification information obtained from the optical signal and the identification information obtained from the radio waves against each other, obtains, when the check result indicates a match, the service information included in the received radio waves, and stores the identification information and the service information into memory 205. In addition, when obtaining the service information, CPU 204 causes entrance gate 210 to allow vehicle 300 to pass.

Moreover, when optical sensor 202*b* receives the optical signal included in outgoing light L emitted by vehicle 300 exiting parking lot 400, CPU 204 obtains the identification information included in the optical signal, and checks the identification information and identification information stored in memory 205 against each other. When memory 205 stores the identification information corresponding to the obtained identification information, CPU 204 transmits radio waves including request information for requesting transmission of the service information, to vehicle 300 via communication interface 206.

Moreover, when receiving the radio waves including the service information from vehicle 300 via communication interface 206, CPU 204 causes exit gate 211 to open. In this case, if a fee such as a parking fee is charged, CPU 204 collects the parking fee using the service information. For example, the service information includes fee information necessary for determining the fee of a service received by the moving body. As a specific example, in the case of a parking lot for which a fee per hour is set, the fee information is time information. Vehicle 300 transmits, as the service information, a time of entrance into parking lot and a time of exit from parking lot to parking apparatus 200. CPU 204 calculates the fee based on the time of entrance into parking lot by vehicle 300 and the time of exit from parking lot by vehicle 300. Furthermore, CPU 204 transmits use information about the use of parking lot such as the calculated fee to vehicle 300 via wireless communicator 103. Accordingly, parking apparatus 200 manages vehicle 300 using parking lot 400.

It should be noted that, as stated above, when receiving the service information from the moving body, CPU 204 causes entrance gate 210 and exit gate 211 to operate. Here, in order to determine which of entrance gate 210 and exit gate 211 is caused to operate, when causing entrance gate 210 to allow the moving body to pass, CPU 204 may transmit management information to the moving body. In this case, when exiting parking lot 400, the moving body may include the management information in the service information. Specifically, CPU 204 may control exit gate 211 when the service information includes the management information, and may control entrance gate 210 when the service information does not include the management information.

Memory 205 is a storage medium that stores the information indicated by the above-described optical signal. In addition, memory 205 stores a control program executed by CPU 204. Memory 205 includes, for example, a read-only memory (ROM), a random-access memory (RAM), a hard disk drive (HDD), and a flash memory.

Communication interface 206 is an interface for mutual communication between CPU 204 and vehicle 300. In other words, CPU 204 wirelessly communicates with vehicle 300 via communication interface 206.

Next, target identification system 200 according to the embodiment will be described.

Figure 4:
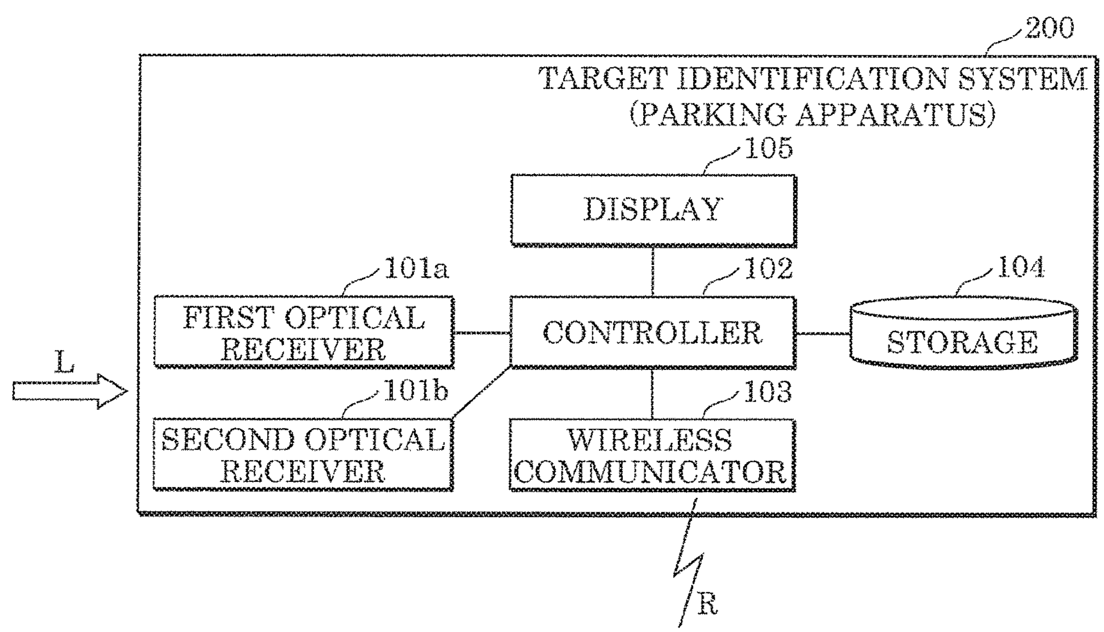
FIG. 4 is a block diagram illustrating a characteristic functional configuration of the target identification system according to the embodiment.

FIG. 4 is a block diagram illustrating a characteristic functional configuration of target identification system 200 according to the embodiment. In other words, FIG. 4 is a block diagram illustrating functions according to the present disclosure among functions of target identification system 200 served by the hardware configuration of parking apparatus 200 that is the specific example of target identification system 200 according to the embodiment illustrated in FIG. 1 to FIG. 3.

As illustrated in FIG. 4, target identification system 200 includes first optical receiver (optical receiver) 101*a*, second optical receiver (optical receiver) 101*b*, controller 102, wireless communicator 103, storage 104, and display 105.

First optical receiver 101*a* and second optical receiver 101*b* are achieved by optical sensor 202*a* and optical sensor 202*b* illustrated in FIG. 3, and receive outgoing light L emitted by vehicle (moving body) 300. It should be noted that in the following description, first optical receiver 101*a* corresponds to optical sensor 202*a* set up on the side of entrance 401 of parking lot 400, and second optical receiver 101*b* corresponds to optical sensor 202*b* set up on the side of exit 402 of parking lot 400.

Controller 102 is a processor implemented by the control program stored in CPU 204 and memory 205 illustrated in FIG. 3.

When the optical receiver (first optical receiver 101*a* or second optical receiver 101*b*) receives outgoing light L including the optical signal, controller 102 receives radio waves R including identification information and service information from the moving body such as vehicle 300 via wireless communicator 103. Specifically, when the optical receiver receives outgoing light L including the optical signal indicating the identification information for identifying the moving body such as vehicle 300, from the moving body, controller 102 obtains an identification signal. Subsequently, controller 102 receives radio waves R including the identification information and the service information from the moving body via wireless communicator 103. Controller 102 checks the identification information obtained from the optical signal and the identification information obtained from radio waves R against each other. When the identification information obtained from the optical signal and the identification information obtained from radio waves R match, controller 102 determines that the identification information and service information obtained from radio waves R are not accidentally received information, and obtains the service information.

Moreover, when the optical receiver (first optical receiver 101*a* or second optical receiver 101*b*) receives outgoing light L including the optical signal, controller 102 transmits radio waves R including confirmation information for requesting transmission of the service information, to the moving body such as vehicle 300 via wireless communicator 103. Specifically, controller 102 transmits radio waves R including the confirmation information for requesting transmission of indication information indicating whether the service information can be transmitted, to the moving body such as vehicle 300 via wireless communicator 103. In the case where controller 102 receives radio waves R including the indication information from the moving body, when the indication information is authorization information indicating authorization for the transmission of the service information, controller 102 receives radio waves R including the identification information and the service information from the moving body via wireless communicator 103, and obtains the service information. Specifically, when first optical receiver 101*a* receives outgoing light L including the optical signal, controller 102 receives radio waves R including the identification information and the service information from the moving body such as vehicle 300 via wireless communicator 103, and obtains the service information.

Moreover, when second optical receiver 101*b* receives outgoing light L including the optical signal, controller 102 transmits information about a service received by the moving body such as use information about the use of parking lot, to the moving body via wireless communicator 103. Here, the use information is, for example, a parking fee charged when parking lot 400 is used.

Moreover, when the optical receiver (first optical receiver 101*a* or second optical receiver 101*b*) receives outgoing light L including the optical signal, controller 102 causes display 105 to display an image indicating that the optical receiver (first optical receiver 101*a* or second optical receiver 101*b*) has received outgoing light L.

Moreover, when receiving radio waves R including the service information via wireless communicator 103, controller 102 causes the gate (entrance gate 210 or exit gate 211) to allow the moving body such as vehicle 300 to pass.

Moreover, controller 102 is connected to first optical receiver 101*a*, second optical receiver 101*b*, and wireless communicator 103 in a communicable manner or electrically.

It should be noted that although controller 102 is implemented through software by CPU 204 executing the control program, the implementation method is not limited to such, and controller 102 may be implemented through hardware by using a dedicated electronic circuit including a gate array etc.

Wireless communicator 103 is a communication interface that is achieved by communication interface 206 illustrated in FIG. 3 and is for mutual communication between controller 102 and vehicle 300. In other words, controller 102 wirelessly communicates with vehicle 300 via wireless communicator 103.

Storage 104 is achieved by memory 305 illustrated in FIG. 3, and stores identification information such as a vehicle registration number indicated by an optical signal included in outgoing light L emitted by vehicle 300.

Display 105 is achieved by display 203 illustrated in FIG. 3, and displays processing currently being executed by controller 102.

[Configuration of Vehicle]

Next, a configuration of vehicle 300 according to the embodiment will be described with reference to FIG. 5A through FIG. 7.

Figure 5A:
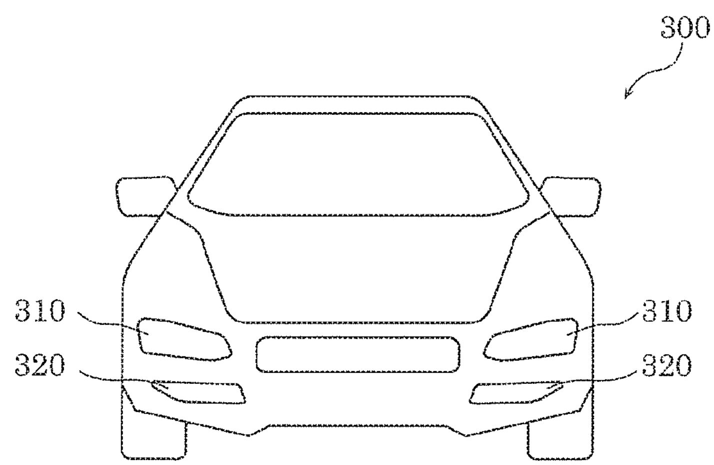
FIG. 5A is a front view of a vehicle according to the embodiment.
Figure 5B:
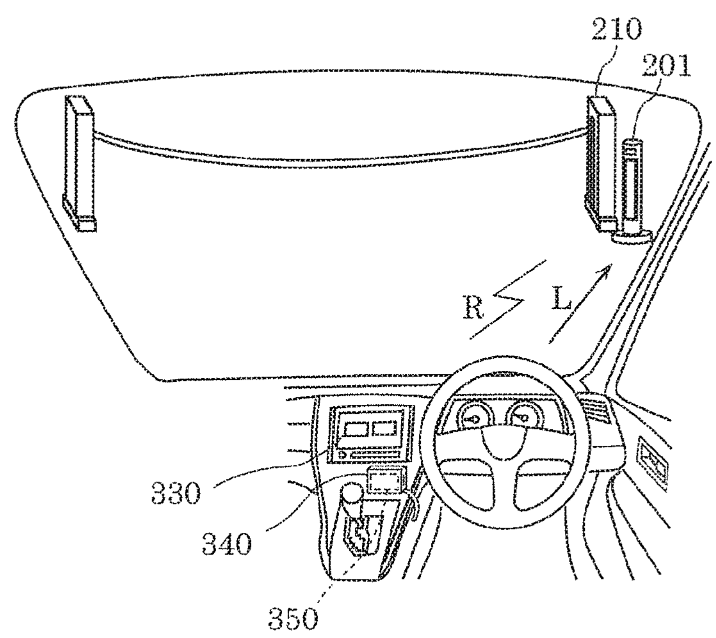
FIG. 5B is a schematic view when an area ahead of the vehicle according to the embodiment is viewed from the inside of the vehicle.
Figure 6:
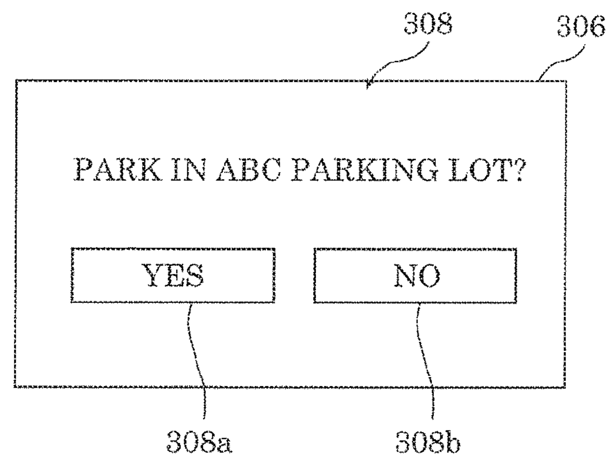
FIG. 6 is a diagram illustrating a specific example of an image displayed on a display included in the vehicle according to the embodiment.
Figure 7:
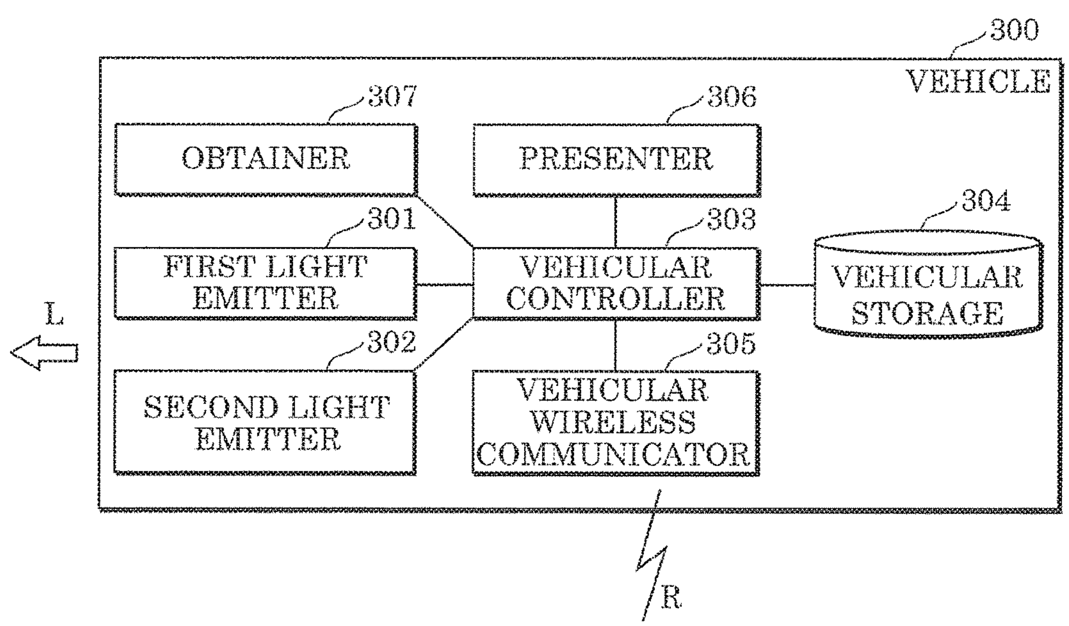
FIG. 7 is a block diagram illustrating a characteristic functional configuration of the vehicle according to the embodiment.

FIG. 5A is a front view of vehicle 300 according to the embodiment. FIG. 5B is a schematic view when an area ahead of vehicle 300 according to the embodiment is viewed from the inside of vehicle 300. FIG. 6 is a diagram illustrating a specific example of an image displayed on a display included in vehicle 300 according to the embodiment. FIG. 7 is a block diagram illustrating a characteristic functional configuration of vehicle 300 according to the embodiment. It should be noted that the term "ahead" indicates the travelling direction of vehicle 300 in the following description.

As stated above, target identification system 200 and parking apparatus 200 that is the specific example of target identification system 200 receive outgoing light L including the optical signal and emitted by vehicle 300, and obtain the identification information for identifying vehicle 300. In other words, vehicle 300 according to the embodiment has a function to emit outgoing light L including the optical signal.

As illustrated in FIG. 5A, vehicle 300 includes headlamps 310 and daytime running lamps 320.

Headlamps 310 and daytime running lamps 320 are front-lighting lamps that emit visible light such as white light to illuminate the area ahead of vehicle 300. Headlamps 310 and daytime running lamps 320 include light sources such as LED lamps and high-intensity discharge (HID) lamps.

Headlamps 310 are front-lighting lamps mainly used in the dark of night and included in vehicle 300 to increase the visibility of the driver of vehicle 300.

Daytime running lamps 320 are front-lighting lamps mainly used in the light of day and included in vehicle 300 to increase the conspicuity of vehicle 300 for oncoming vehicles, pedestrians, etc. Vehicle 300 causes at least one of headlamps 310 or daytime running lamps 320 to emit outgoing light L including the optical signal.

As illustrated in FIG. 5B, vehicle 300 includes touch panel display 330 and ETC transponder 340.

Touch panel display 330 is a display device that displays an image in response to a wireless signal such as confirmation information included in radio waves R received from roadside device 201. In addition, touch panel display 330 is an input device that receives an instruction from the driver of vehicle 300. It should be noted that a subject that gives the instruction is not necessarily the driver. For example, in the case of a vehicle, a fellow passenger in the passenger seat may give the instruction. In the following description, an operation (instruction) performed by the driver may be performed by an occupant (operator) of vehicle (moving body) 300 such as a fellow passenger in the passenger seat etc.

Vehicle 300 (specifically at least one of headlamps 310 or daytime running lamps 320) emits outgoing light L including the optical signal toward roadside device 201. Outgoing light L may always include the optical signal, or an operation switch (not shown) may be provided in vehicle 300, and outgoing light L may include the optical signal by the driver operating the switch, and is not particularly limited. Roadside device 201 receives outgoing light L including the optical signal.

Here, as stated above, when receiving outgoing light L including the optical signal, roadside device 201 transmits radio waves R including the confirmation information that is information for confirming whether the drive intends to use parking lot 400, to vehicle 300 via communication interface 206. Touch panel display 330 displays an image corresponding to the confirmation information.

As illustrated in FIG. 6, for example, touch panel 330 displays selection image 308 that is for confirming whether the driver of vehicle 300 intends to park in a parking lot (ABC parking lot in FIG. 6) and that includes authorization portion 308*a* and unauthorization portion 308*b*. The driver of vehicle 300 indicates whether to park, by selecting authorization portion 308*a* or unauthorization portion 308*b*. Vehicle 300 transmits radio waves R including indication information corresponding to the selection, to roadside device 201.

As illustrated in FIG. 7, vehicle 300 includes, as functions, first light emitter 301, second light emitter 302, vehicular controller 303, vehicular storage 304, vehicular wireless communicator 305, presenter 306, and obtainer 307.

First light emitter 301 and second light emitter 302 are achieved by headlamps 310 or daytime running lamps 320 illustrated in FIG. 5A, and emit outgoing light L that is visible light such as white light to illuminate the area ahead of vehicle 300. Specifically, at least one of first light emitter 301 or second light emitter 302 emits above-described outgoing light L including the optical signal.

When obtainer 307 obtains an instruction from the driver of vehicle 300, vehicular controller 303 transmits radio waves R including indication information indicating the instruction, to wireless communicator 103 via vehicular wireless communicator 305. In addition, vehicular controller 303 causes at least one of first light emitter 301 or second light emitter 302 to emit outgoing light L including the optical signal.

Vehicular controller 303 is achieved by, for example, a CPU and a control program stored in vehicular storage 304.

Vehicular storage 304 is a memory that stores the control program executed by the CPU including above-described vehicular controller 303. Vehicular storage 304 includes, for example, a ROM, a RAM, an HDD, and a flash memory.

Vehicular wireless communicator 305 is a communication interface for mutual communication between vehicular controller 303 and parking apparatus 200. In other words, vehicular controller 303 wirelessly communicates with parking apparatus 200 via vehicular wireless communicator 305.

Presenter 306 is a device (user interface) that makes a presentation according to information included in radio waves R received from roadside device 201. As an example, presenter 306 is a display device that displays an image (e.g., selection image 308) according to the information included in radio waves R received from roadside device 201. Presenter 306 is, for example, a display. It should be noted that presenter 306 may be, for example, a loudspeaker that provides sound according to the information included in radio waves R received from roadside device 201.

Obtainer 307 obtains an instruction from the driver of vehicle 300. Obtainer 307 in the embodiment is a touch panel, and obtains the instruction from the driver by the driver directly pressing authorization portion 308*a* or unauthorization portion 308*b*. In other words, touch panel display 330 functionally includes presenter 306 and obtainer 307. It should be noted that obtainer 307 may be newly included as a push button in vehicle 300.

[Procedure Performed by Target Identification System, Parking Apparatus, and Vehicle]

Next, procedures of target identification system 200, parking apparatus 200, which is the specific example of target identification system 200, and vehicle 300 will be described with reference to FIG. 8 through FIG. 14.

First, a procedure in which vehicle 300 emits outgoing light L including an optical signal will be described with reference to FIG. 8.

Figure 8:
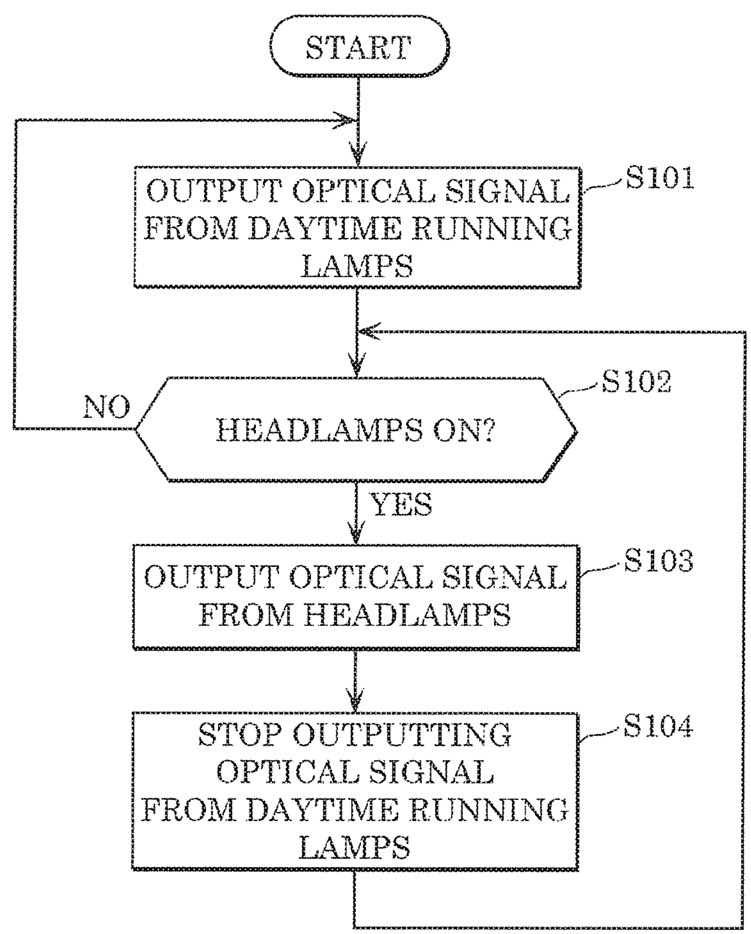
FIG. 8 is a flow chart illustrating a procedure in which the vehicle according to the embodiment outputs an optical signal.

FIG. 8 is a flow chart illustrating a procedure in which vehicle 300 according to the embodiment outputs an optical signal.

As illustrated in FIG. 8, the driver of vehicle 300 causes vehicle 300 to operate. In the embodiment, at this time, vehicle 300 is preset to cause daytime running lamps 320 to emit light. Moreover, when daytime running lamps 320 are emitting outgoing light L, outgoing light L is preset to always include an optical signal. Specifically, when the driver causes vehicle 300 to operate, vehicular controller 303 causes daytime running lamps 320 to output an optical signal indicating the identification information for identifying vehicle 300 (step S101). It should be noted that in the following description, the optical signal is assumed to include the identification information for identifying vehicle 300.

Next, vehicular controller 303 determines whether headlamps 310 light up (step S102). When the driver causes headlamps 310 to light up (YES in step S102), vehicular controller 303 causes headlamps 310 to output the optical signal (step S103). In addition, vehicular controller 303 causes daytime running lamps 320 to stop outputting the optical signal (step S104).

Moreover, when the driver does not cause headlamps 310 to light up (NO in step S102), vehicular controller 303 causes daytime running lamps 320 to output the optical signal (step S101). When daytime running lamps 320 are already caused to output the optical signal, vehicular controller 303 maintains the output of the optical signal in step S101.

In this manner, vehicle 300 is capable of causing at least one of headlamps 310 or daytime running lamps 320 to output the optical signal.

Next, a procedure that is completed when parking apparatus 200 causes entrance gate 210 to open will be described with reference to FIG. 9 through FIG. 11.

Figure 9:
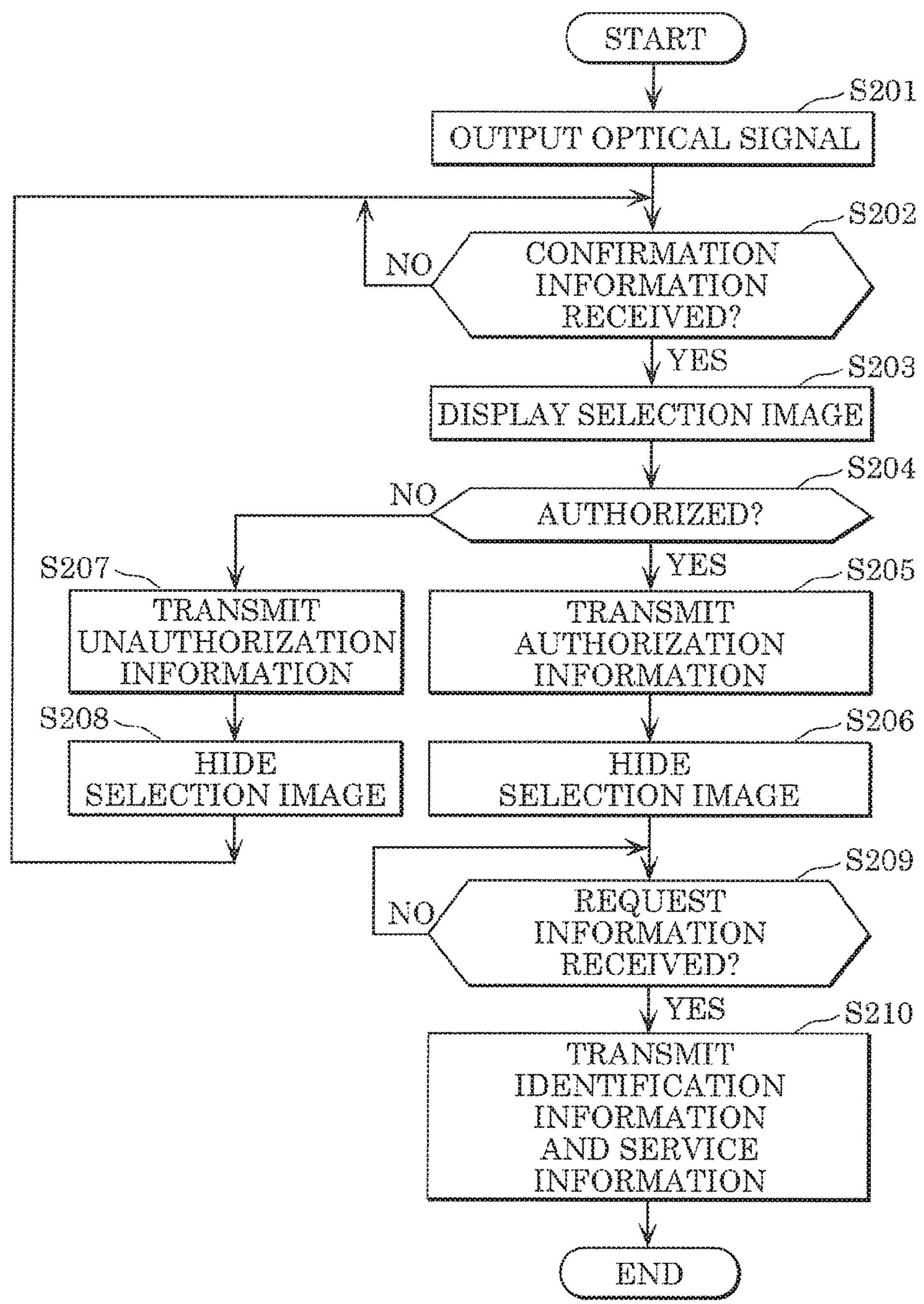
FIG. 9 is a flow chart illustrating a procedure for transmitting and receiving signals when the vehicle according to the embodiment enters the parking lot.

FIG. 9 is a flow chart illustrating a procedure for transmitting and receiving signals by vehicle 300 according to the embodiment when vehicle 300 enters parking lot 400.

As illustrated in FIG. 9, vehicle 300 moves while emitting outgoing light L including an optical signal (outputting the optical signal) (step S201).

When vehicle 300 approaches parking apparatus 200, first optical receiver 101*a* receives outgoing light L including the optical signal. In order to confirm whether the driver of vehicle 300 wants to use parking lot 400, controller 102 transmits radio waves R including confirmation information for requesting transmission of indication information indicating the intention of the driver to park (whether service information can be transmitted), via wireless communicator 103.

When receiving radio waves R including the confirmation information via vehicular wireless communicator 305 (YES in step S202), vehicular controller 303 causes presenter 306 to display selection image 308 including authorization portion 308*a* and unauthorization portion 308*b* (step S203).

The driver selects authorization portion 308*a* or unauthorization portion 308*b*. When obtainer 307 obtains unauthorization for use of parking lot 400 from the driver (NO in step S204), vehicular controller 303 transmits radio waves R including unauthorization information indicating non-use of parking lot 400, to parking apparatus 200 via vehicular wireless communicator 305 (step S207). In addition, vehicular controller 303 causes presenter 306 to hide displayed selection image 308 (step S208).

When obtainer 307 obtains authorization for use of parking lot 400 from the driver (YES in step S204), vehicular controller 303 transmits radio waves R including authorization information indicating use of parking lot 400, to parking apparatus 200 via vehicular wireless communicator 305 (step S205). Specifically, vehicular controller 303 transmits radio waves R including the authorization information indicating transmission of the service information, to parking apparatus 200 via vehicular wireless communicator 305, when an instruction to authorize the use of parking lot 400 is an instruction to authorize the transmission of the service information, in the case where obtainer 307 obtains the instruction from the driver. In addition, vehicular controller 303 causes presenter 306 to hide displayed selection image 308 (step S206).

When receiving radio waves R including request information for requesting transmission of service information via vehicular wireless communicator 305 (YES in step S209), vehicular controller 303 transmits radio waves R including the identification information and the service information to parking apparatus 200 via vehicular wireless communicator 305 (step S210).

Figure 10:
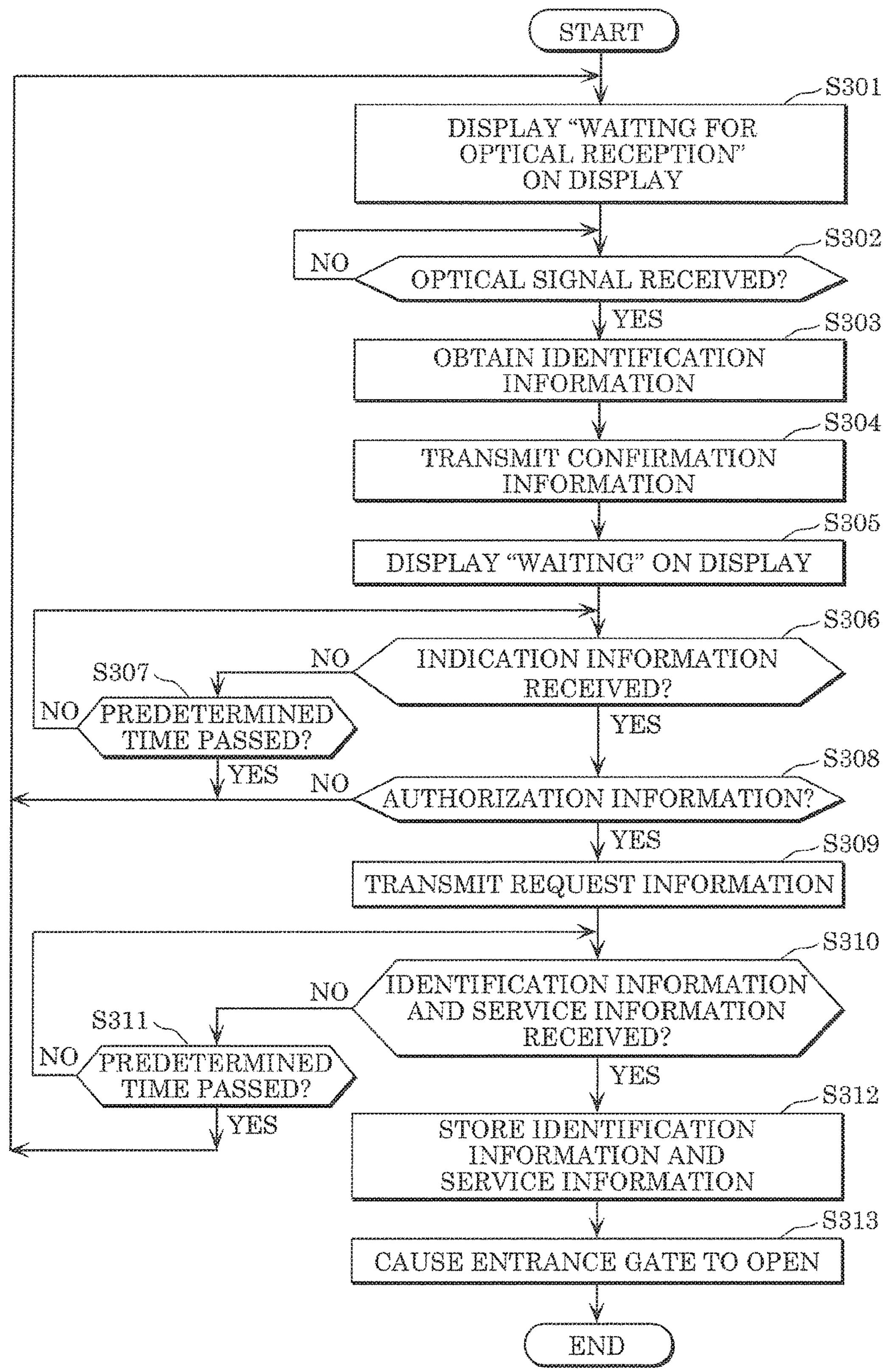
FIG. 10 is a flow chart illustrating a procedure that is completed when the parking apparatus according to the embodiment causes an entrance gate to open.

FIG. 10 is a flow chart illustrating a procedure that is completed when parking apparatus 200 according to the embodiment causes entrance gate 210 to open.

As illustrated in FIG. 10, controller 102 first causes display 105 (display 203*a*) to display a state indicating that outgoing light L including an optical signal has not been received (step S301). For example, controller 102 causes display 105 (display 203*a*) to display "Waiting for optical reception."

When first optical receiver 101*a* receives outgoing light L including the optical signal (YES in step S302), controller 102 obtains the identification information indicated by the optical signal (step S303).

Moreover, controller 102 checks whether the driver of vehicle 300 uses parking lot 400. Specifically, when first optical receiver 101*a* receives outgoing light L including the optical signal, controller 102 transmits radio waves R including confirmation information for requesting transmission of indication information indicating the intention of the driver to park, via wireless communicator 103 (step S304).

Furthermore, controller 102 changes the content displayed on display 105 (display 203*a*) to a content indicating outgoing light L including that the optical signal has been received (step S305). For example, controller 102 causes display 105 (display 203*a*) to display "Waiting."

When receiving radio waves R including the indication information from vehicle 300 via wireless communicator 103 (YES in step S306), controller 102 determines whether the indication information includes authorization information indicating the use of parking lot 400 (step S308). When the authorization information is included (YES in step S308), controller 102 transmits radio waves R including request information for requesting transmission of service information, to vehicle 300 via wireless communicator 103 (step S309).

When controller 102 does not receive radio waves R including the indication information (NO in step S306) and a predetermined time passes (YES in step S307), controller 102 determines that the driver does not use parking lot 400, and returns the processing to step S301. Moreover, when the received indication information does not include the authorization information or includes unauthorization information (NO in step S308), controller 102 determines that the driver does not use parking lot 400, and returns the processing to step S301.

It should be noted that the predetermined time is not particularly limited, and may be 10 seconds, 30 seconds, or 60 seconds. Moreover, in order to count the predetermined time, parking apparatus 200 (controller 102) may include a time counter (not shown) such as a real time clock (RTC).

Next, when receiving radio waves R including the identification information and the service information via wireless communicator 103 (YES in step S310), controller 102 obtains the identification information and the service information, and causes storage 104 to store the identification information and the service information (step S312). Specifically, when receiving radio waves R including the identification information and the service information via wireless communicator 103, controller 102 obtains the identification information and the service information. In addition, controller 102 determines whether the identification obtained from the optical signal and the identification information included in radio waves R match, and causes storage 104 to store the identification information and the service information when there is the match (step S312). In this manner, parking apparatus 200 accurately identifies vehicle 300 receiving a service, and improves the reliability of communication between vehicle 300 and parking apparatus 200 (roadside device 201). It should be noted that in step S312, controller 102 may determine whether the identification obtained from the optical signal and the identification information included in radio waves R match, and may cause display 105 (display 203*a*) to display, when the identification obtained from the optical signal and the identification information included in radio waves R do not match, the mismatch. In addition, in this case, controller 102 may return the processing to step S309.

Moreover, controller 102 causes entrance gate 210 to allow vehicle 300 to pass (step S313).

Furthermore, when controller 102 does not receive radio waves R including ETC information in step S309 (NO in step S306) and a predetermined time passes (YES in step S311), controller 102 determines that the driver does not use parking lot 400, and returns the processing to step S301.

It should be noted that the predetermined time is not particularly limited, and may be 10 seconds, 30 seconds, or 60 seconds.

Figure 11:
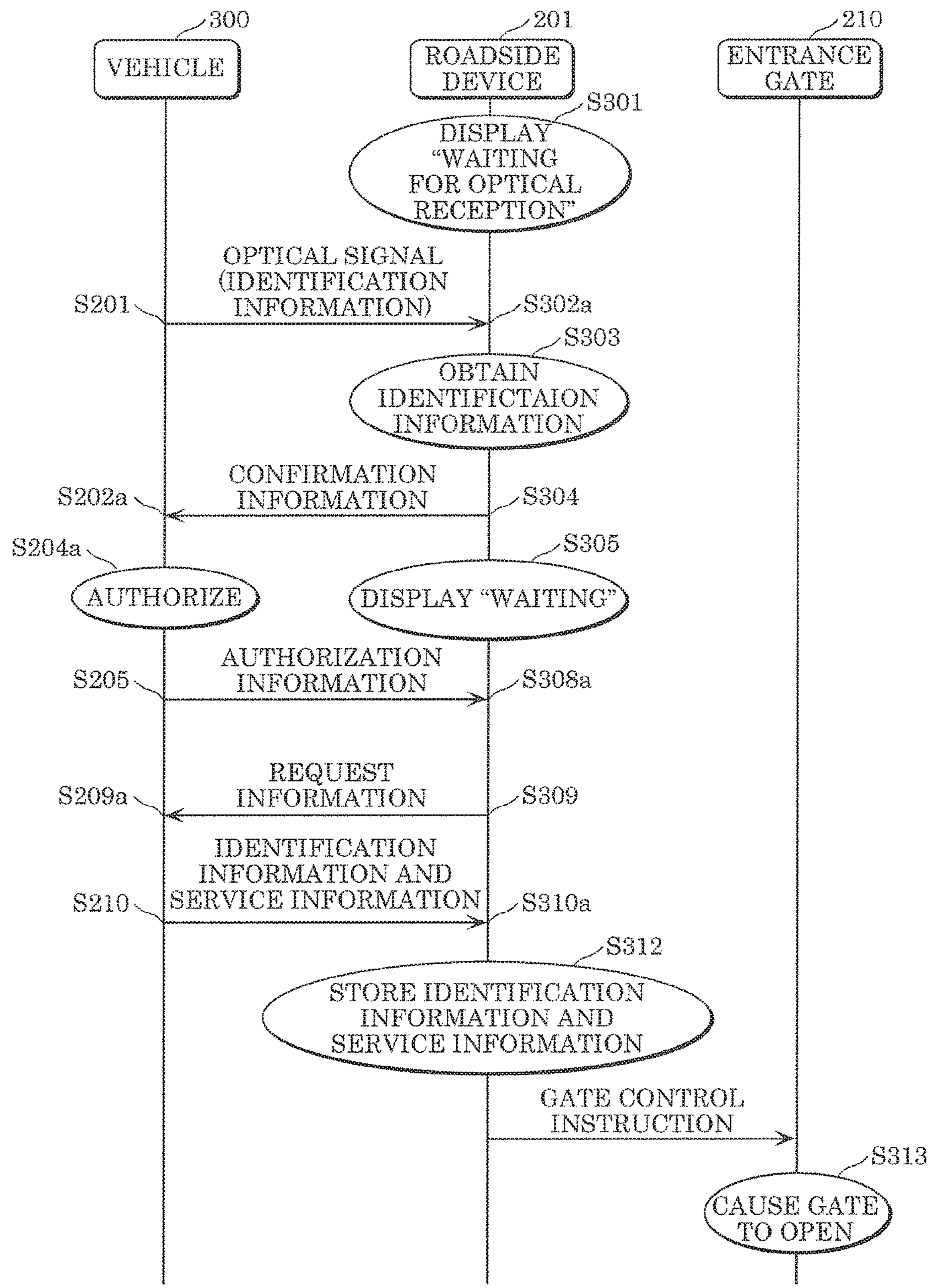
FIG. 11 is a sequence diagram illustrating the procedure that is completed when the parking apparatus according to the embodiment causes the entrance gate to open.

FIG. 11 is a sequence diagram illustrating the procedure that is completed when parking apparatus 200 according to the embodiment causes entrance gate 210 to open. In other words, FIG. 11 is a sequence diagram illustrating the procedure of vehicle 300 in FIG. 9 and the procedure of parking apparatus 200 in FIG. 10 that are completed when parking apparatus 200 causes entrance gate 210 to open. It should be noted that in FIG. 11, substantially the same steps as in FIG. 9 and FIG. 10 are assigned the same reference signs, and overlapping description thereof is omitted or simplified. In addition, FIG. 11 is a sequence diagram when the driver of vehicle 300 uses parking lot 400.

As illustrated in FIG. 11, controller 102 first causes display 105 (display 203*a*) to display a state indicating that outgoing light L including an optical signal has not been received (step S301). For example, controller 102 causes display 105 (display 203*a*) to display "Waiting for optical reception."

Vehicle 300 moves while emitting outgoing light L including the optical signal (outputting the optical signal) (step S201). For this reason, when vehicle 300 approaches parking apparatus 200, first optical receiver 101*a* receives the optical signal (step S302*a*), and obtains an identification signal indicated by the optical signal.

In order to confirm whether the driver of vehicle 300 wants to use parking lot 400, controller 102 transmits radio waves R including confirmation information for requesting transmission of indication information, to vehicle 300 via wireless communicator 103 (step S304). In addition, controller 102 causes display 105 (display 203*a*) to display "Waiting" (step S305).

When receiving radio waves R including the confirmation information via vehicular wireless communicator 305 (step S202*a*), vehicular controller 303 causes presenter 306 to display selection image 308 (see FIG. 6).

When obtainer 307 obtains from the driver authorization (indication to authorize) for use of parking lot 400 (step S204*a*), vehicular controller 303 transmits radio waves R including authorization information to roadside device 201 via vehicular wireless communicator 305 (step S205).

When receiving radio waves R including the authorization information via wireless communicator 103 (step S308*a*), controller 102 transmits radio waves R including request information for requesting transmission of service information, to vehicle 300 via wireless communicator 103 (step S309).

Next, when receiving radio waves R including the request information via vehicular wireless communicator 305 (step S209), vehicular controller 303 transmits the identification information and the service information to roadside device 201 via vehicular wireless communicator 305 (step S210).

Next, when receiving radio waves R including the identification information and the service information via wireless communicator 103 (step S310*a*), controller 102 obtains the identification information and the service information, and causes storage 104 to store the identification information and the service information (step S312).

Moreover, controller 102 causes entrance gate 210 to allow vehicle 300 to pass. Entrance gate 210 allows vehicle 300 to pass (step S313).

Next, a procedure that is completed when parking apparatus 200 causes exit gate 211 to open will be described with reference to FIG. 12 through FIG. 14.

Figure 12:
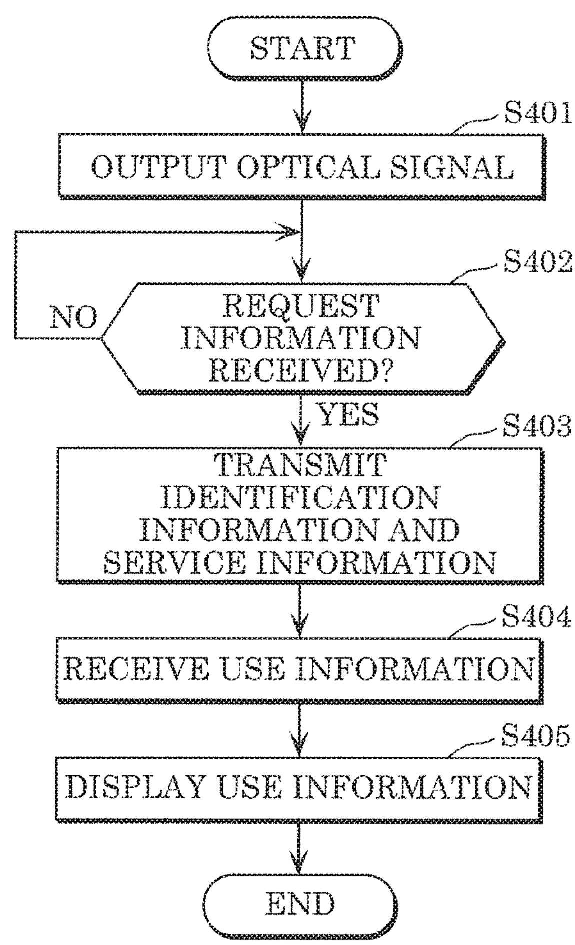
FIG. 12 is a flow chart illustrating a procedure for transmitting and receiving signals when the vehicle according to the embodiment exits the parking lot.

FIG. 12 is a flow chart illustrating a procedure for transmitting and receiving signals when vehicle 300 according to the embodiment exits parking lot 400.

As illustrated in FIG. 12, vehicle 300 moves while emitting outgoing light L including an optical signal (outputting the optical signal) (step S401). For this reason, when vehicle 300 approaches parking apparatus 200, second optical receiver 101*b* receives the optical signal.

When receiving radio waves R including request information for requesting transmission of service information via vehicular wireless communicator 305 (YES in step S402), vehicular controller 303 transmits radio waves R including the service information to roadside device 201 via vehicular wireless communicator 305 (step S403).

If a parking fee is charged, roadside device 201 having received radio waves R including the service information collects the parking fee. Controller 102 transmits radio waves R including use information (collection information) about the collected parking fee via wireless communicator 103. Vehicular controller 303 receives radio waves R including the use information via vehicular wireless communicator 305 (step S404).

In addition, vehicular controller 303 causes presenter 306 to display, for example, the parking fee according to the use information (step S405).

Figure 13:
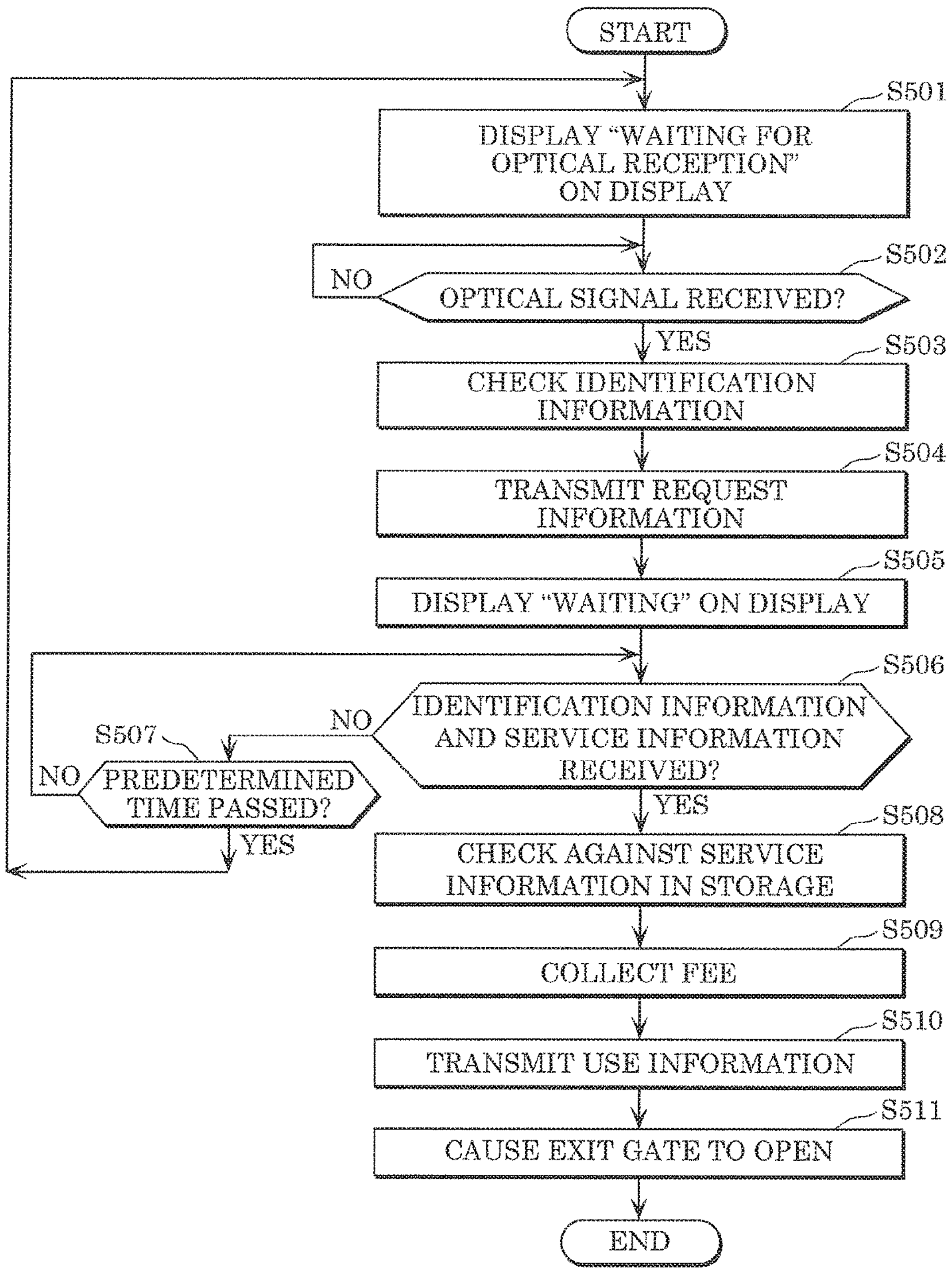
FIG. 13 is a flow chart illustrating a procedure that is completed when the parking apparatus according to the embodiment causes an exit gate to open.

FIG. 13 is a flow chart illustrating the procedure that is completed when parking apparatus 200 according to the embodiment causes exit gate 211 to open.

As illustrated in FIG. 13, controller 102 first causes display 105 (display 203*b*) to display a state indicating that outgoing light L including an optical signal has not been received (step S501). For example, controller 102 causes display 105 to display "Waiting for optical reception."

When second optical receiver 101*b* receives outgoing light L including the optical signal (YES in step S502), controller 102 checks the identification information indicated by the received optical signal and identification information stored in storage 104 against each other (step S503). Specifically, controller 102 determines whether the identification information indicated by the received optical signal is stored in storage 104. When the identification information indicated by the received optical signal is stored in storage 104, controller 102 determines that the driver of vehicle 300 is a user of parking lot 400. It should be noted that when the identification information indicated by the received optical signal is not stored in storage 104, controller 102 may cause display 105 (display 203*a*) to display the lack of the identification information. In addition, in this case, controller 102 may return the processing to step S501.

Next, controller 102 transmits radio waves R including request information for requesting transmission of service information, to vehicle 300 via wireless communicator 103 (step S504).

Moreover, controller 102 changes the content displayed on display 105 (display 203*b*) to a content indicating that outgoing light L including the optical signal has been received (step S505). For example, controller 102 causes display 105 (display 203*a*) to display "Waiting."

Next, when controller 102 does not receive radio waves R including the service information (NO in step S506) and a predetermined time passes (YES in step S507), controller 102 determines that the driver does not intend to exit parking lot 400, and returns the processing to step S501. It should be noted that the predetermined time is not particularly limited, and may be 10 seconds, 30 seconds, or 60 seconds.

Moreover, when receiving radio waves R including the identification information and the service information via wireless communicator 103 (YES in step S506), controller 102 checks the received service information and service information stored in storage 104 against each other (step S508).

Specifically, when receiving radio waves R including the identification information and the service information, controller 102 checks the received identification information and the identification information stored in storage 104 against each other. In addition, when the received identification information and the identification information that are checked match, controller 102 obtains service information stored in storage 104 together with the identification information, and checks the service information and the received service information against each other.

Next, controller 102 collects a parking fee of vehicle 300 based on the checked service information (step S509). Moreover, controller 102 transmits radio waves R including use information (collection information) about the collected parking fee or the like to vehicle 300 via wireless communicator 103 (step S510).

Next, controller 102 causes exit gate 211 to allow vehicle 300 to pass (step S511).

Figure 14:
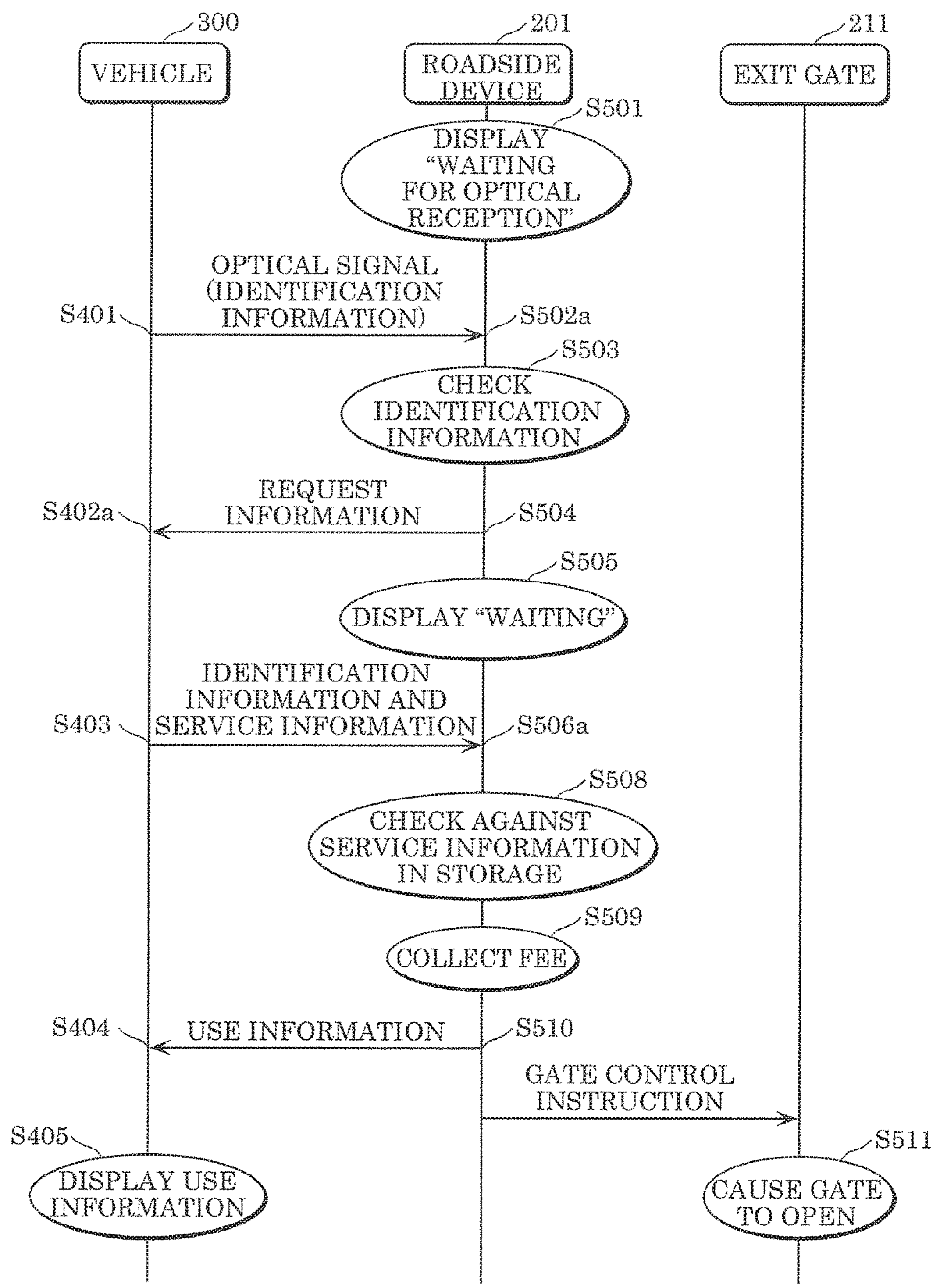
FIG. 14 is a sequence diagram illustrating the procedure that is completed when the parking apparatus according to the embodiment causes the exit gate to open.

FIG. 14 is a sequence diagram illustrating the procedure that is completed when parking apparatus 200 according to the embodiment causes exit gate 211 to open. In other words, FIG. 14 is a sequence diagram illustrating the procedure of vehicle 300 in FIG. 12 and the procedure of parking apparatus 200 in FIG. 13 that are completed when parking apparatus 200 causes exit gate 211 to open. It should be noted that in FIG. 14, substantially the same steps as in FIG. 12 and FIG. 13 are assigned the same reference signs, and overlapping description thereof is omitted or simplified.

As illustrated in FIG. 14, controller 102 causes display 105 (display 203*b*) to display "Waiting for optical reception" (step S501).

Vehicle 300 moves while emitting outgoing light L including an optical signal (step S401). For this reason, when vehicle 300 approaches parking apparatus 200, second optical receiver 101*b* receives the optical signal (step S502*a*).

Controller 102 checks the identification information indicated by the optical signal included in received outgoing light L and identification information stored in storage 104 against each other (step S503).

Moreover, controller 102 transmits radio waves R including request information for requesting transmission of service information, to vehicle 300 via wireless communicator 103 (step S504). In addition, controller 102 causes display 105 (display 203*b*) to display "Waiting" (step S505).

Next, when receiving radio waves R including the request information via vehicular wireless communicator 305 (step S402*a*), vehicular controller 303 transmits radio waves R including the identification information and the service information to roadside device 201 via vehicular wireless communicator 305 (step S403).

Next, when receiving radio waves R including the identification information and the service information via wireless communicator 103 (step S506*a*), controller 102 checks the service information and service information stored in storage 104 against each other (step S508).

Here, controller 102 collects a parking fee of vehicle 300 based on the checked service information (step S509). Moreover, controller 102 transmits radio waves R including use information about the collected parking fee or the like to vehicle 300 via wireless communicator 103 (step S510).

Vehicular controller 303 receives radio waves R including the use information via vehicular wireless communicator 305 (step S404). In addition, vehicular controller 303 causes presenter 306 to display, for example, the parking fee according to the use information (step S405).

Moreover, controller 102 causes exit gate 211 to allow vehicle 300 to pass. Exit gate 211 allows vehicle 300 to pass (step S511). As stated above, a service system including target identification system 200 and vehicle 300 according to the embodiment reduces the occurrence of interference in communication between target identification system 200 providing a service and vehicle 300 receiving the service. Accordingly, the reliability of communication between target identification system 200 and vehicle 300 is improved.

[Advantageous Effects Etc.]

As described above, target identification system 200 according to the present disclosure includes one or more optical receivers (first optical receiver 101*a* and/or second optical receiver 101*b*) which receive outgoing light L from a moving body, outgoing light L including an optical signal indicating identification information for identifying the moving body. Target identification system 200 further includes controller 102 which is connected to the one or more optical receivers. In addition, target identification system 200 includes wireless communicator 103 which is connected to controller 102. When the one or more optical receivers receive outgoing light L, controller 102 obtains the identification information. When controller 102 receives radio waves R including the obtained identification information and service information via wireless communicator 103, in the case where the identification information included in outgoing light L matches the identification information included in radio waves R, controller 102 obtains the service information, the service information being information necessary for the moving body to receive a predetermined service.

With this, target identification system 200 performs wireless communication using radio waves R when receiving outgoing light L including the optical signal from the moving body such as vehicle 300. Target identification system 200 identifies the moving body using the optical signal which is less likely to cause interference and makes it easy to identify a target, that is, having high reliability of communication. In addition, after obtaining the identification for identifying the moving body using the optical signal, target identification system 200 further performs wireless communication using radio waves R communicable over a wide area. Accordingly, target identification system 200 improves the reliability of communication.

Moreover, controller 102 may obtain the identification information when the one or more optical receivers (first optical receiver 101*a* and/or second optical receiver 101*b*) receive outgoing light L, and may transmit radio waves R including confirmation information for requesting transmission of the service information, to the moving body via wireless communicator 103. Furthermore, controller 102 may transmit radio waves R including request information for requesting the service information, to the moving body via wireless communicator 103 when controller 102 receives radio waves R including authorization information indicating authorization for the transmission of the service information, and may obtain the service information when controller 102 receives radio waves R including the identification information and the service information from the moving body via wireless communicator 103.

With this, target identification system 200 is capable of confirming with the moving body such as vehicle 300 whether, for example, the moving body receives a service provided by target identification system 200 of parking lot 400. In other words, even when, for example, target identification system 200 wrongly receives outgoing light L including the optical signal from the moving body such as vehicle 300 which does not use parking lot 400, target identification system 200 is capable of appropriately determining whether the moving body such as vehicle 300 receives the above-described service.

Moreover, target identification system 200 may further include display 105. In this case, when the one or more optical receivers (first optical receiver 101*a* and/or second optical receiver 101*b*) receive outgoing light L, controller 102 may cause display 105 to display an image indicating that the one or more optical receivers have received outgoing light L.

With this, target identification system 200 is capable of visually notifying the moving body such as vehicle 300 of a state in which outgoing light L including the optical signal has been received from the moving body. Accordingly, for example, the driver of vehicle 300 can easily know whether the optical signal is appropriately outputted.

Moreover, the service information may include charging information necessary for charging a fee for the predetermined service received by the moving body.

In other words, target identification system 200 is suitable for a case where the moving body needs to be more accurately identified, such as a case where a fee charged when the moving body such as vehicle 300 receives a service such as use of a toll parking lot needs to be collected.

Moreover, the service information may include electronic toll collection (ETC) information.

In other words, target identification system 200 is suitable for a system using ETC for identifying a moving body by wireless communication and collecting a fee. Target identification system 200 reduces interference, accurately identifies the moving body, and improves the reliability of communication.

Moreover, target identification system 200 may be achieved as parking apparatus 200 which is disposed in parking lot 400 and includes above-described target identification system 200. In parking apparatus 200, the one or more receivers included in target identification system 200 may each include: first optical receiver 101*a* which is disposed at entrance 401 of parking lot 400 and receives outgoing light L; and second optical receiver 101*b* which is disposed at exit 402 of parking lot 400 and receives outgoing light L. Controller 102 may obtain the service information when controller 102 receives radio waves R including the identification information and the service information from the moving body via wireless communicator 103, in the case where first optical receiver 101*a* receives outgoing light L. In addition, controller 102 may transmit radio waves R including use information about use of parking lot 400 to the moving body via wireless communicator 103 when second optical receiver 101*b* receives outgoing light L, the use information indicating the predetermined service received by the moving body.

In other words, above-described target identification system 200 is suitable for, for example, parking apparatus 200 for use in parking lot 400. After identifying vehicle 300 using the optical signal, parking apparatus 200 further performs wireless communication using radio waves R communicable over a wide area. For this reason, parking apparatus 200 improves the reliability of communication.

Moreover, parking apparatus 200 may further include a gate (entrance gate 210 and/or exit gate 211) at at least one of entrance 401 or exit 402. In this case, when controller 102 receives radio waves R including the service information via wireless communicator 103, controller 102 may cause the gate (entrance gate 210 and/or exit gate 211) to allow the moving body to pass.

Accordingly, parking apparatus 200 easily manages vehicle 300 using parking lot 400.

Moreover, vehicle 300 according to the embodiment includes: first light emitter 301 which emits outgoing light L including an optical signal indicating identification information for identifying vehicle 300; vehicular controller 303 which is connected to first light emitter 301; and vehicular wireless communicator 305 which is connected to vehicular controller 303. Furthermore, vehicle 300 receives radio waves R including confirmation information for requesting transmission of service information, via vehicular wireless communicator 305, the service information being information necessary for vehicle 300 to receive a predetermined service. In this case, vehicle 300 further includes presenter 306 which makes a presentation to cause a person (operator) in vehicle 300 such as a driver to select an instruction according to the confirmation information. In addition, vehicle 300 further includes obtainer 307 which obtains an instruction from the above-described operator. Vehicular controller 303 transmits radio waves R including authorization information via vehicular wireless communicator 305, when the instruction is an instruction to authorize the transmission of the service information, in the case where obtainer 307 obtains the instruction from the above-described operator, the authorization information indicating authorization for the transmission of the service information. In addition, vehicular controller 303 further transmits radio waves R including the identification information and the service information via vehicular wireless communicator 305, when the instruction is an instruction to authorize the transmission of the service information, in the case where obtainer 307 obtains the instruction from the above-described operator.

In other words, vehicle 300 is suitable for a moving body with which target identification system 200 communicates. Such vehicle 300 is less likely to cause interference with target identification system 200 providing a service, and is accurately identified with ease.

Moreover, vehicle 300 may further include second light emitter 302. In this case, vehicular controller 303 may cause at least one of first light emitter 301 or second light emitter 302 to emit outgoing light L.

By vehicle 300 including light emitters capable of emitting an optical signal, it is possible to reduce a transmission error such as a failure to output an optical signal.

Moreover, at least one of first light emitter 301 or second light emitter 302 may be headlamps 310, and the other of first light emitter 301 and second light emitter 302 may be daytime running lamps 320.

In other words, daytime running lamps 320 which are often turned on, for example, in the light of day, and headlamps 310 which are often turned on, for example, in the dark of night are capable of emitting the optical signal. Vehicle 300 may be configured to cause daytime running lamps 320 and headlamps 310 which are less likely to be turned on in synchronization with each other to emit the optical signal. In such a configuration, when, for example, outgoing light L is set to always include the optical signal, one of daytime running lamps 320 and headlamps 310 is likely to be turned on. Specifically, by causing one of daytime running lamps 320 and headlamps 310 that are already turned on to emit the optical signal, vehicle 300 does not need to turn on a light emitter such as daytime running lamps 320 and headlamps 310 in order to emit the optical signal. This reduces the power consumption of vehicle 300.

Other Embodiments

Although target identification system 200 etc. according to the embodiment have been described above, the present disclosure is not limited to such an embodiment.

The target identification system described in the aforementioned embodiment is an example. For example, although the parking apparatus has been described as the specific example of the target identification system according to the aforementioned embodiment, the target identification system may be applied to a collection system of a toll road or the like.

Moreover, the aforementioned embodiment has described the case in which the parking apparatus includes the gates for both the entrance and exit of the parking. In this case, the parking apparatus does not cause the exit gate to transmit the radio waves including the confirmation information for requesting the transmission of the indication information indicating whether the driver wants to exit the parking lot, and causes the exit gate to transmit the radio waves including the request information for requesting the transmission of the service information. In the above case, when transmitting the radio waves including the confirmation information for requesting the transmission of the indication information indicating whether the driver wants to exit the parking lot, and receiving radio waves including information indicating the intention to exit the parking lot, the parking apparatus may transmit radio waves including the request information to the vehicle.

Moreover, in the aforementioned embodiment, the parking apparatus causes the parking entrance to receive the identification information and the service information from the vehicle, and causes the storage to store the identification information and the service information. Moreover, the parking apparatus causes the parking exit to obtain the service information from the vehicle, and collects the parking fee based on the service information and the service information stored in the storage. Here, when the parking entrance receives the identification information and the service information from the vehicle, the parking apparatus may transmit fee information about the parking fee to the vehicle without storing the service information. In this case, the vehicle stores the fee information into the vehicular storage. The parking apparatus causes the parking exit to obtain the fee information from the vehicle. In this manner, the parking apparatus may collect the parking fee.

Moreover, in the aforementioned embodiment, when receiving a request signal from the parking apparatus at the parking entrance, the vehicle transmits the service information. However, when transmitting authorization information, the vehicle may transmit the service information along with the authorization information.

Moreover, in the aforementioned embodiment, the vehicle causes the light emitters such as the headlamps and the daytime running lamps to emit an optical signal. For example, vehicle 300 may be configured to cause light emitters including light sources, such as turn signals (hazard lamps) and fog lamps, to emit an optical signal.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A target identification system, comprising:

an optical receiver which receives outgoing light from a moving body, the outgoing light including an optical signal indicating first information for identifying the moving body;

a controller which is connected to the optical receiver; and a wireless communicator which is connected to the controller, wherein:

when the optical receiver receives the outgoing light, the controller obtains the first information, when the controller receives radio waves including the first information and second information from the moving body via the wireless communicator, the controller determines whether the first information included in the outgoing light matches the first information included in the radio waves, and in the case where the first information included in the outgoing light matches the first information included in the radio waves, the controller obtains the second information, the second information being information necessary for the moving body to receive a predetermined service, and the controller:

in response to receiving the first information by the optical receiver, transmits radio waves including confirmation information for requesting transmission of the second information, to the moving body via the wireless communicator;

transmits radio waves including request information for requesting the second information, to the moving body via the wireless communicator when the controller receives radio waves including authorization information indicating authorization for the transmission of the second information, from the moving body via the wireless communicator; and obtains the second information when the controller receives the radio waves including the first information and the second information from the moving body via the wireless communicator.

2. The target identification system according to claim 1, further comprising a display, wherein when the optical receiver receives the outgoing light, the controller causes the display to display an image indicating that the optical receiver has received the outgoing light.

3. The target identification system according to claim 1, wherein the second information includes charging information necessary for charging a fee for the predetermined service received by the moving body.

4. The target identification system according to claim 1, wherein the second information includes electronic toll collection (ETC) information.

5. A parking apparatus which is disposed in a parking lot and includes a target identification system, wherein:

the target identification system comprises:

an optical receiver which receives outgoing light from a moving body, the outgoing light including an optical signal indicating first information for identifying the moving body;

a controller which is connected to the optical receiver; and a wireless communicator which is connected to the controller, wherein:

when the optical receiver receives the outgoing light, the controller obtains the first information, and when the controller receives radio waves including the first information and second information from the moving body via the wireless communicator, the controller determines whether the first information included in the outgoing light matches the first information included in the radio waves, and in the case where the first information included in the outgoing light matches the first information included in the radio waves, the controller obtains the second information, the second information being information necessary for the moving body to receive a predetermined service, the optical receiver includes:

a first optical receiver which is disposed at an entrance of the parking lot; and a second optical receiver which is disposed at an exit of the parking lot, and the controller:

obtains the first information when the controller receives the radio waves including the first information and the second information from the moving body via the wireless communicator, in the case where the first optical receiver receives the outgoing light; and transmits radio waves including use information about use of the parking lot to the moving body via the wireless communicator when the second optical receiver receives the outgoing light, the use information indicating the predetermined service received by the moving body.

6. The parking apparatus according to claim 5, further comprising a gate at at least one of the entrance or the exit, wherein when the controller receives radio waves including the second information via the wireless communicator, the controller causes the gate to allow the moving body to pass.

7. The parking apparatus according to claim 5, further comprising an entrance gate at the entrance and an exit gate at the exit, wherein the controller:

in response to receiving the outgoing light by the first optical receiver, transmits radio waves including request information for requesting the second information, to the moving body via the wireless communicator;

obtains the second information and causes the entrance gate to allow the moving body to pass, when the controller receives the radio waves including the first information and the second information from the moving body via the wireless communicator, in the case where the first information included in the outgoing light matches the first information included in the radio waves;

in response to receiving the outgoing light by the second optical receiver, transmits the request information for requesting the second information, to the moving body via the wireless communicator; and transmits the radio waves including the use information about the use of the parking lot to the moving body via the wireless communicator, and causes the exit gate to allow the moving body to pass, when the controller receives the radio waves including the first information and the second information from the moving body via the wireless communicator, the use information indicating the predetermined service received by the moving body.

8. A vehicle comprising:

a first light emitter which emits outgoing light including an optical signal indicating first information for identifying the vehicle;

a vehicular controller which is connected to the first light emitter;

a vehicular wireless communicator which is connected to the vehicular controller;

a user interface which, when the vehicular controller receives radio waves including confirmation information via the vehicular wireless communicator, makes a presentation to cause an operator to input an instruction according to the confirmation information, the confirmation information being information for requesting transmission of second information, the second information being information necessary for the vehicle to receive a predetermined service; and an obtainer which obtains the instruction, wherein the vehicular controller transmits, via the vehicular wireless communicator, radio waves including authorization information, and radio waves including the second information and the first information that matches the first information included in the outgoing light, when the instruction is an instruction to authorize the transmission of the second information, in the case where the obtainer obtains the instruction, the authorization information indicating authorization for the transmission of the second information.

9. The vehicle according to claim 8, further comprising a second light emitter, wherein the vehicular controller causes at least one of the first light emitter or the second light emitter to emit the outgoing light.

10. The vehicle according to claim 9, wherein at least one of the first light emitter or the second light emitter is a headlamp, and the other of the first light emitter and the second light emitter is a daytime running lamp.

11. The target identification system according to claim 1, wherein the controller:

does not transmit the radio waves including the request information to the moving body via the wireless communicator when a predetermined time has passed without the controller receiving the radio waves including the authorization information; and does not obtain the second information when the controller receives the radio waves including the first information and the second information from the moving body via the wireless communicator.

12. The target identification system according to claim 2, wherein the controller:

when the optical receiver does not receive the outgoing light, causes the display to display an image indicating that the optical receiver has not received the outgoing light;

when the optical receiver receives the outgoing light, causes the display to display the image indicating that the optical receiver has received the outgoing light; and when the controller has not received the radio waves including the first information and the second information from the moving body via the wireless communicator for a predetermined time, causes the display to switch from the image indicating that the optical receiver has received the outgoing light to the image indicating that the optical receiver has not received the outgoing light.

13. The vehicle according to claim 10, wherein the vehicular controller:

causes the daytime running lamp to emit the outgoing light including the optical signal;

when the headlamp is turned on, causes the headlamp to emit the outgoing light including the optical signal, and causes the daytime running lamp not to emit the outgoing light including the optical signal; and when the headlamp is turned off, causes the daytime running lamp to emit the outgoing light including the optical signal.

* * * * *